United States Patent [19]

Koubek

[11] 4,064,531
[45] Dec. 20, 1977

[54] PROCESS AND CIRCUIT FOR DECODING THE OUTPUT SIGNAL OF A CAMERA TUBE IN A SINGLE-TUBE COLOR TELEVISION CAMERA

[75] Inventor: Michael Koubek, Munich, Germany

[73] Assignee: Siemens Aktiengesellschaft, Berlin & Munich, Germany

[21] Appl. No.: 676,617

[22] Filed: Apr. 13, 1976

[30] Foreign Application Priority Data

Apr. 24, 1975 Germany .......................... 2518247

[51] Int. Cl.² .......................... H04N 9/07; H04N 5/14
[52] U.S. Cl. ........................................ 358/44; 358/37; 358/47; 358/166; 358/31
[58] Field of Search .................. 358/21, 30, 37, 39, 358/162, 166, 44, 47, 31; 178/DIG. 25

[56] References Cited

U.S. PATENT DOCUMENTS

| | | | |
|---|---|---|---|
| 3,444,318 | 5/1969 | Monteath | 358/162 |
| 3,588,827 | 6/1971 | Van Roessel et al. | 358/30 X |
| 3,729,580 | 4/1973 | Schneider | 358/37 X |
| 3,780,212 | 12/1973 | Glenn, Jr. | 358/44 |
| 3,952,327 | 4/1976 | Hofman et al. | 358/37 |

Primary Examiner—John C. Martin
Assistant Examiner—Mitchell Saffian
Attorney, Agent, or Firm—Hill, Gross, Simpson, Van Santen, Steadman, Chiara & Simpson

[57] ABSTRACT

A circuit and process for decoding the output signal of a single-tube color television camera which is characterized in that the output signal of the camera tube is connected to a high-pass filter and a low-pass filter each of which are followed by two series-connected delay lines exhibiting a delay in each case of one line length, that the series connection of the delay lines are each connected to two summing elements each with three inputs for the undelayed signal, the singly delayed signal and the doubly delayed signal, where a further summing element for the undelayed and the doubly delayed high frequency signal is connected to the high-pass filter and the following delay lines, that the outputs of the first two summing elements which are connected to the high-pass filter each lead through a band-pass filter and a demodulator to an input of a matrix. A third and fourth summing element are connected to the doubly delayed, the singly delayed and the undelayed lines from the low-pass filter. A fifth summing element is connected to the doubly delayed line and to the undelayed line from the high-pass filter, a transit time element connected to the fifth summing element which serves to match the transit time of the low-pass filter and the outputs of the two summing elements connected to the low-pass filter, to the inputs of an adder element, where the output of the adder element carries the clearly defined luminance signal and two outputs from the matrix which carry two color difference signals.

4 Claims, 2 Drawing Figures

PROCESS AND CIRCUIT FOR DECODING THE OUTPUT SIGNAL OF A CAMERA TUBE IN A SINGLE-TUBE COLOR TELEVISION CAMERA

BACKGROUND OF THE INVENTION

The invention relates to a process and a circuit arrangement for decoding the output signal of a camera tube in a single-tube color television camera with two color strip filters which are rotated towards the picture axis, where, in the output signal of the camera tube the low-frequency spectrum of a luminance signal is separated from the color carrier frequency band range of color component signals which are intermeshed in a so-called quarter line offset, and where the color component signals are obtained via comb filters.

A process of this type, and a circuit arrangement for the execution of this process are known and described in the British Pat. No. 1,333,672. The output signal of the camera tube contains a luminance signal in the spectrum of which spectral lines occur as whole-numbered multiples of the line frequency. In addition the output signal of the camera tube contains two color signals whose spectra are intermeshed with one another and with the spectral lines of the luminance signal and in fact normally in accordance with the PAL-standard in a so-called quarter-line offset. The spectral lines of the two color spectra here occur fundamentally in a frequency band around the color carrier frequency which is established by the repetition frequency of the color strips. In accordance with the prior art, the three intermeshed spectra are separated in that the output signal of the camera tube is fed to a low-pass filter and to a band-pass filter. The low-pass filter limits the luminance signal range to a low-frequency range up to a lower cut-off frequency at which the color carrier frequency band range, which is to be processed, of the color signals, commences. The band-pass filter limits this range from the aforementioned lower cut-off frequency to an upper cut-off frequency which is symmetrical to the former in respect of the color carrier frequency. The spectral lines lying above the upper cut-off frequency of the band-pass filter are not processed. The intermeshed color spectra which are obtained from the band-pass filter are then processed via comb filters and demodulators to form two color component signals. The third color component signal is obtained by combining the first two with the output signal of the low-pass filter, the luminance signal (see in particular FIGS. 3 and 6 and British Pat. No. 1,333,672).

This known decoding of the output signal of the camera tube of a single-tube color television camera on the one hand has the disadvantage that in order to obtain the luminance signal, the spectrum of the spectral lines containing the luminance information must be drastically limited to the range from zero to the lower cut-off frequency. The information contained in the spectral lines above this cut-off frequency is lost for the luminance signal. This means that the luminance signal becomes relatively poorly defined. On the other hand, separating the color spectra from one another via simple comb filters has the disadvantage that the acquired color component signals possess a relatively poor resolution in the vertical direction, i.e., that horizontal lines become blurred. These color component signals with a poor vertical resolution are combined with the luminance signal from the low-pass filter, which latter possesses no such impairment of the vertical resolution. The third color component signal obtained by the combination has a better vertical resolution than the two other color component signals. This means that horizontal colored edges occur. The impairment of the vertical resolution by the comb filter occurs due to the comb filter characteristic, in accordance with which those frequencies located between the accumulation points, i.e., the transmissive points of the comb filter, are suppressed. For example, maximum contrast values, with which alternating differing extreme values with half the line frequency occur line by line, are no longer transmitted.

SUMMARY OF THE INVENTION

An object of the present invention is to provide a decoding process and a corresponding circuit arrangement with which, as far as possible, the whole of the information supplied by the camera tube is processed, and where the aforementioned disadvantages of a poorly defined luminance and horizontal colored edges do not occur.

To achieve this desired result, in a process of the type described in the introduction, in accordance with this invention, the following procedures are taken:

a. The entire frequency spectrum of the output signal of the camera tube is divided into a low-frequency spectrum and a high frequency spectrum including the color carrier frequency band range;

b. The corresponding low-frequency signal and the corresponding high-frequency signal are each delayed by one and by one further line duration;

c. The undelayed and the doubly delayed high frequency signal in each case with the factor $(1+j)$ and the singly delayed high frequency signal with the factor $(+2)$ are added to form a first carrier color component signal;

d. The undelayed and the doubly delayed high frequency signal in each case with the factor $(1+j)$ and the singly delayed high frequency signal with the factor $(-2)$ are added to form a second carrier color component signal;

e. The undelayed high frequency signal and the doubly delayed high frequency signal with the factor $(-1)$ are added to form a horizontal contour signal;

f. The undelayed and the doubly delayed low frequency signal in each case with the factor $\sqrt{2}$ and the singly delayed low frequency signal with the factor $(+2)$ are added to form a relatively poorly defined luminance signal;

g. The undelayed and the doubly delayed low frequency signal and the singly delayed low frequency signal with the factor $(-2)$ are added to form a vertical contour signal;

h. The relatively poorly defined luminance signal, the horizontal contour signal and the vertical contour signal are added to form a well defined luminance signal;

i. The carrier color component signals are bandlimited in their frequency spectrum, are demodulated and are matrixed within the relatively poorly defined luminance signal to form two color difference signals.

A circuit arrangement in accordance with the invention for the execution of the process of the invention is characterized in that an input for the output signal of the camera tube is connected to a high-pass filter and a low-pass filter each of which are followed by two series-connected delay lines exhibiting a delay of in each case one line length, that the series connections of the delay lines are each connected to two summing elements each with three inputs for the undelayed signal, the singly delayed signal and the doubly delayed signal, where a further summing element for the undelayed and the doubly delayed high frequency signal is connected to the high-pass filter and the following delay lines, that the outputs of the first two summing elements which are connected to the high-pass filter each lead across a band-pass filter and a demodulator to an input of a matrix, that the output of the further summing element is connected via a transit time element which serves to match the transit time of the low-pass filter and the outputs of the two summing elements connected to the low-pass filter, to the inputs of an adder element, where the output of the adder element carries the clearly defined luminance signal and two outputs of the matrix carry two color difference signals.

With the aid of the process in accordance with the invention, and the circuit arrangement of the invention, it is possible to fully exploit the luminance information supplied by the camera tube. The resolution of the reproduced luminance reaches a maximum possible value because the luminance signal supplied by the color television camera produces the full definition of the possible resolution of the camera tube. The use of the color spectra is in fact, as in the prior art, limited to a color carrier frequency range located around the color carrier; however, the color difference signals which are to be transmitted are acquired by combining a relatively poorly defined luminance signal with the likewise relatively poorly defined color component signals, so that no color is given preference in the resolution. Therefore, colored horizontal edges cannot occur. In accordance with the invention, the whole of the separation of the three intermeshed spectra in the output signal of the camera tube is effected with comb filters. A comb filter is provided in each case for the high frequency range, i.e., for those frequencies lying above the aforementioned lower cut-off frequency, and also for the low-frequency range. These two comb filters each contain two delay lines. By combining the undelayed, the singly delayed and the doubly delayed signals it is ensured that those frequencies located between the accumulation points, i.e., the transmissive points of a comb filter with one single delay line are not suppressed, so that the frequencies required for the vertical resolution can be fully exploited. This is effected, in particular, in the formation of the vertical contour signal which for the purpose of a better vertical resolution, i.e., for the formation of clearly defined horizontal lines, is added to the relatively poorly defined luminance signal. The horizontal contour signal which is also added to the relatively poorly defined luminance signal, with the aid of those spectral lines of the luminance spectrum which lie above the aforementioned lower cut-off frequency, produce the high resolution in the horizontal direction, i.e., sharp vertical lines.

An advantageous embodiment of a process in accordance with the invention and the associated circuit arrangement relates to the comb filter for the low-frequency range. This embodiment consists in that the low-frequency signal is transposed into a color carrier frequency state by the modulation of a color carrier, that the delays are carried out with this carrier low-frequency signal, that then the undelayed, the singly delayed and the doubly delayed signals are again demodulated and the summations are again effected in the low-frequency state.

In the corresponding circuit arrangement, a modulator is connected between the low-pass filter and the delay lines, and in each case a demodulator is connected to the terminals of the delay lines for the undelayed, for the singly delayed and for the doubly delayed carrier low-frequency signal. In addition for the suppression of carrier frequency residues, a low-pass filter is in each case connected between the outputs of the summing elements and the corresponding inputs of the adder element for the relatively poorly defined luminance signal and for the vertical contour signal. This advantageous development serves to simplify the construction of the comb filter in that the delay lines for the carrier frequency range are simpler to produce than for the low-frequency range.

In another advantageous development of a circuit arrangement in accordance with the invention a zero-point suppression element is connected between the low-pass filter for the vertical contour signal and the corresponding input of the adder element. It is thus ensured that in this way only signals which contribute towards increasing the vertical resolution are conducted to the relatively poorly defined luminance signal. This avoids a so-called mouse-tooth effect.

BRIEF DESCRIPTION OF THE DRAWINGS

Making reference to two block circuit diagrams shown in the FIGS. of the drawing, the invention will be explained in further detail. In the drawing.

TABLE OF SYMBOLS

As used herein, the following symbols are used to refer to the elements indicated:
M — output signals of a color camera
HP — high pass filter
TP — low pass filter
BP — band pass filter
$T_H$ — delay line
Dem — demodulator
$M_H$ — high frequency signal
$M_O$ — low frequency signal
W — sharply defined luminance signal
$W_O$ — poorly defined luminance signal
$W_V$ — vertical contour signal
$W_H$ — horizontal contour signal

DESCRIPTION OF THE PREFERRED EMBODIMENTS

Figure 1:
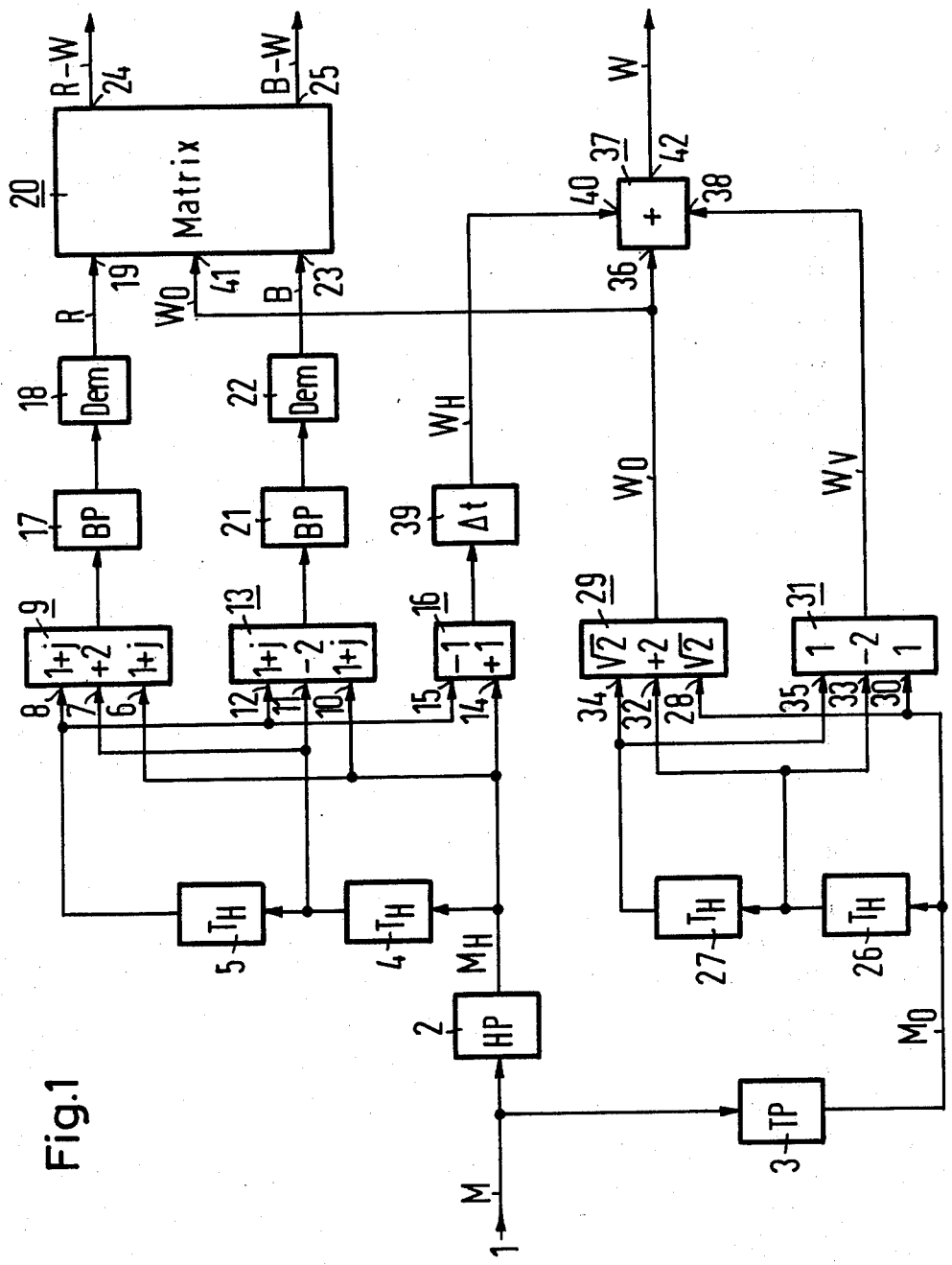
FIG. 1 is a circuit arrangement of the invention for the execution of the process of the invention.

In FIG. 1, an input is referenced 1, which conducts the output signals M of a camera tube with two color strip filters turned preferably symmetrically towards the picture axis. This input 1 is connected to a high-pass filter 2 and a low-pass filter 3. The output of the high-pass filter 2 carries a high-frequency signal $M_H$ and is connected to the input of a delay line 4. The output of the delay line 4 is connected to the input of a further delay line 5. The output of the high-pass filter 2 leads to an input 6, the output of the delay line 4 leads to an input 7, and the output of the delay line 5 leads to an input 8 of a summing element 9. In addition the output of the high-pass filter 2 leads to an input 10, the output of the delay line 4 leads to an input 11, and the output of the delay line 5 leads to an input 12 of a summing element 13. The output of the high-pass filter 2 also leads to an input 14, and the output of the delay line 5 leads to an input 15 of a summing element 16. The input signals connected to the inputs 6 and 8 of the summing element 9 and those connected to the inputs 10 and 12 of the summing element 13 are each multiplied by a factor $(1+j)$ where $j = \sqrt{-1}$, an imaginary number. The input signal applied to the input 7 of the summing element 9 is multiplied with a factor $(+2)$, the input signal applied to the input 11 of the summing element 13 is multiplied by a factor $(-2)$, and the input signal applied to the input 14 of the summing element 15 is multiplied by a factor $(+1)$, whereas the input signal applied to the input 15 of the summing element 16 is multiplied by a factor $(-1)$. The output of the summing element 9 leads across a band-pass filter 17 and in series thereto via a demodulator 18 to an input 19 of a matrix 20. The output of the summing element 13 leads across a band-pass filter 21 and in series thereto across a demodulator 22 to an input 23 of the matrix 20. The demodulator 18 supplies a color component signal R for the color red, the demodulator 22 supplies a color component signal B for the color blue. The matrix 20 has two outputs 24 and 25, of which the output 24 carries a color difference signal $(R-W)$ and the output 25 carries a color difference signal $(B-W)$.

The output of the low-pass filter 3 carries a low-frequency signal $M_O$ and is connected to the input of a delay line 26. The output of the delay line 26 is connected to the input of a further delay line 27. The output of the low-pass filter 3 is connected to an input 28 of a summing element 29 and to the input 30 of a summing element 31. The output of the delay line 26 is connected to an input 32 of the summing element 29 and to an input 33 of the summing element 31. The output of the delay line 27 is connected to an input 34 of the summing element 29 and to an input 35 of the summing element 31. The input signals applied to the inputs 28 and 34 of the summing element 29 are multiplied by the factor $\sqrt{2}$. The input signals applied to the inputs 30 and 35 of the summing element 3 are multiplied by the factor $(30\ 1)$. The input signal applied to the input 32 of the summing element 29 is multiplied by the factor $(+2)$, and the input signal applied to the input 33 of the summing element 31 is multiplied by the factor $(-2)$.

The output of the summing element 29 carries a relatively poorly defined luminance signal $W_O$ and is connected to an input 36 of an adder element 37. The output of the summing element 31 carries a vertical contour signal $W_V$ and is connected to an input 38 of the adder element 37. The output of the summing element 16 is lead to a delay element 39 which forms the transit time of the low-pass filter 3 also for the output signal of the summing element 16. The delay element 39 supplies a horizontal contour signal $W_H$ and is connected to an input 40 of the adder element 37. The output of the summing element 29 is also connected to an input 41 of the matrix 20. The output 42 of the adder element 37 carries a sharply defined luminance signal W. The delay lines 4, 5, 26 and 27 possess a delay amounting to the duration of one line of the electron beam scanning of the camera tube.

The output signal M of the camera tube is split up via a high-pass filter 2 into a high-frequency signal $M_H$ and a low-frequency signal $M_O$. The high-frequency signal $M_H$ is fed to a comb filter which is formed by the two delay lines 4 and 5 and by the summing elements 9, 13 and 16. The low-frequency signal $M_O$ is fed to a comb filter which is formed by the two delay lines 26 and 27 and by the two summing elements 29 and 31.

From the summing elements 9 and 13 are taken two carrier color component signals which, via the band-pass filters 17 and 21 and via the demodulators 18 and 22 are shaped to form color component signals R and B in the base-band, i.e., in the low-frequency band. The summing element 29 supplies a relatively poorly defined luminance signal $W_O$ which, together with the color component signals R and B, for the formation of the color difference signals $(R-W)$ and $(B-W)$ is fed to the matrix 20. In the adder element 37, the horizontal contour signal $W_H$ supplied by the summing element 16 and the vertical contour signal $W_V$ supplied by the summing element 31 are added to the relatively poorly defined luminance signal $W_O$ to form the sharply defined luminance signal W.

Figure 2:
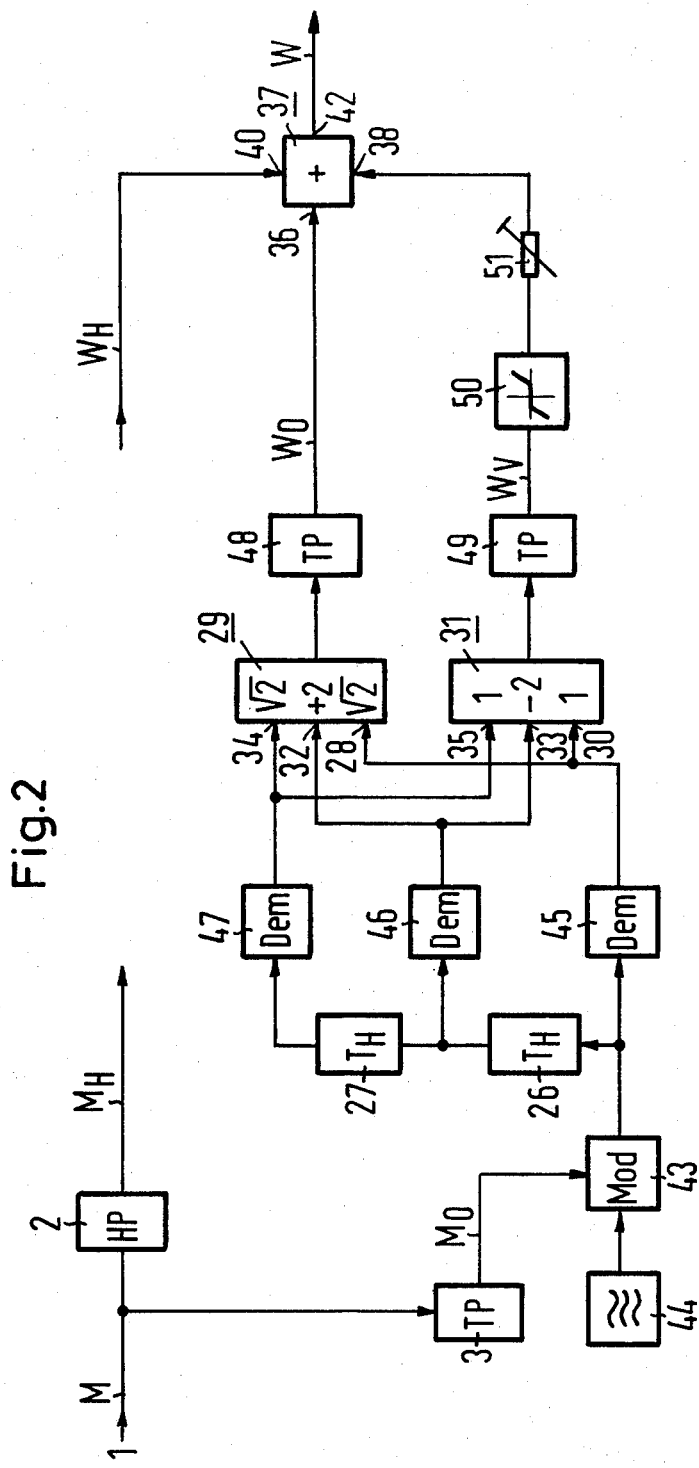
FIG. 2 shows the low-frequency component of the same circuit arrangement with the advantageous embodiment of the comb filter with delay lines in the carrier frequency range.

FIG. 2 contains an extension of the low-frequency component of the circuit arrangement shown in FIG. 1. Between the low-pass filter 3 and the delay line 26 is connected a modulator 43 which is connected to a generator 44 for the color carrier frequency. A demodulator 45 is also connected between the input of the delay line 26 and the inputs 30 and 28 of the summing element 31 and 29. Likewise, a demodulator 46 is arranged between the output of the delay line 26 and the inputs 33 and 32 of the summing element 31, 29. In addition, a demodulator 47 is connected between the output of the delay line 27 and the inputs 35 and 34 of the summing element 31, and 29. A low-pass filter 48 is arranged between the output of the summing element 29 and the input 36 of the adder element 37. The series connection of a low-pass filter 49 to a zero point suppression element 50 and a potentiometer 51 is located between the output of the summing element 31 and the input 38 of the adder element 37.

In accordance with this embodiment, represented in FIG. 2, of a process in accordance with the invention and a circuit arrangement in accordance with the invention, the delay lines 26 and 27 of the comb filter operate for the low-frequency range in the carrier frequency band because the low-frequency signal $M_O$ taken from the low-pass filter 3 has been modulated by the modulator 3 into the carrier-frequency band. Having passed through the delay lines 26 and 27, the low-frequency signals are demodulated back into the base state, i.e., into the low-frequency state for purposes of summation in the summing elements 29 and 31. The low-pass filters 48 and 49 serve to filter out color-carrier frequency residues. The zero-point suppression element 50 serves to suppress interference signals which possess a lower amplitude than the amplitudes of the vertical contour signal $W_V$. As described above, this serves to prevent the so-called mouse-tooth effect.

It will be apparent to those skilled in the art that many modifications and variations may be effected without departing from the spirit and scope of the novel concepts of the present invention.

I claim as my invention:

1. A circuit arrangement comprising:
   a. means for dividing the entire frequency spectrum of the output signal of a camera tube into a low-frequency spectrum and a high-frequency spectrum including the color carrier frequency band range;
   b. means for taking the corresponding low-frequency signal and the corresponding high-frequency signal and delaying each by one and also by one further line duration;

c. means for multiplying the undelayed and the doubly delayed high frequency signal in each case with the factor $(1+j)$ where $j = \sqrt{-1}$ and the singly delayed high frequency signal with the factor $(+2)$ and means for adding the multiplied signal to form a first carrier color component signal;

d. means for multiplying the undelayed and the doubly delayed high frequency signal in each case with the factor $(1+j)$ and the singly delayed high frequency signal with the factor $(-2)$ and means for adding the multiplied signals to form a second carrier color component signal;

e. means for multiplying the undelayed high frequency signal and the doubly delayed high frequency signal with the factor $(-1)$ and means for adding the multiplied signals to form a horizontal contour signal;

f. means for multiplying the undelayed and the doubly delayed low frequency signal in each case with the factor $\sqrt{2}$ and the singly delayed low frequency signal with the factor $(+2)$ and means for adding the multiplied signals to form a relatively poorly defined luminance signal;

g. means for multiplying the undelayed and the doubly delayed low frequency signal and the singly delayed low frequency signal with the factor $(-2)$ and means for adding the multiplied signals to form a vertical contour signal;

h. means for adding the relatively poorly defined luminance signal, the horizontal contour signal and the vertical contour signal to form a well defined luminance signal;

i. means for band limiting in their frequency spectrum the carrier color component signals; and j. means for demodulating the band limited color component signals and for matrixing the same with the relatively poorly defined luminance signal to form two color difference signals.

2. A circuit arrangement comprising:

a. means including a first low-pass filter and a high pass filter for dividing the entire frequency spectrum of the output signal of a camera tube into a low-frequency signal and a high-frequency signal including the color carrier frequency signal;

b. a first modulator to which the low-frequency signal is connected;

c. a color carrier frequency generator connected to said first modulator;

d. first and second delay lines to which the output of said modulator is serially connected;

e. first, second and third demodulators, the first of which is connected to the output of said modulator, the second of which is connected to the output of said first delay line, and the third of which is connected to the output of said second delay line;

f. first and second summing elements;

g. means for feeding the output of said first demodulator to said first summing element and multiplying it with a factor of (1) and to said second summing element and multiplying it with the factor of $\sqrt{2}$;

h. means for feeding the output of said second demodulator and multiplying it with a factor of $(-2)$ to said first summing element and multiplying it with a factor of $(+2)$ to said second summing element;

i. means for feeding the output of said third demodulator and multiplying it with a factor of (1) to said first summing element and multiplying it with a factor of $\sqrt{2}$ to the second summing element;

j. second and third low-pass filters connected, respectively, to the outputs of said first and second summing elements;

k. an adder having first, second and third inputs and one output;

l. the output of said second low-pass filter being connected through a circuit to said first input of said adder;

m. the output of said third low-pass filter being connected to said second input of said adder; and n. means for feeding a high-frequency luminance signal to said third input of said adder, whereby the output of said adder provides a sharply defined luminance signal;

3. A circuit arrangement according to claim 2, in which a zero-point suppression element and a variable resistance element are serially connected between the output of said second low-pass filter and said first input of said adder.

4. A circuit arrangement comprising:

a. means including a low-pass filter and a high-pass filter for dividing the entire frequency spectrum of the output signal of a camera tube into a low frequency signal and a high frequency signal including the color carrier frequency signals;

b. means for deriving a high frequency luminance signal from the high frequency component of the output signal of said camera;

c. means for deriving a poorly defined luminance signal from an undelayed, a singly delayed and a twice delayed signal by multiplying these signals with factors of $(\sqrt{2})$, $(+2)$, and $(\sqrt{2})$, respectively, and adding them in the output circuit of said low-pass filter;

d. means for deriving a vertical luminance signal from an undelayed, a singly delayed and a twice delayed signal by multiplying these signals with factors of $(1)$, $(-2)$, and $(1)$, respectively, and adding them in the output circuit of said low-pass filter; and e. means for adding said high frequency luminance signal, said poorly defined luminance signal, and said vertical luminance signal to provide a sharply defined luminance signal.

* * * * *